Jan. 8, 1952  W. H. HARSTICK  2,581,530
MILKING MACHINE TRAP

Filed Dec. 22, 1949  2 SHEETS—SHEET 1

Inventor:
William H. Harstick
Paul O. Pippel
Atty.

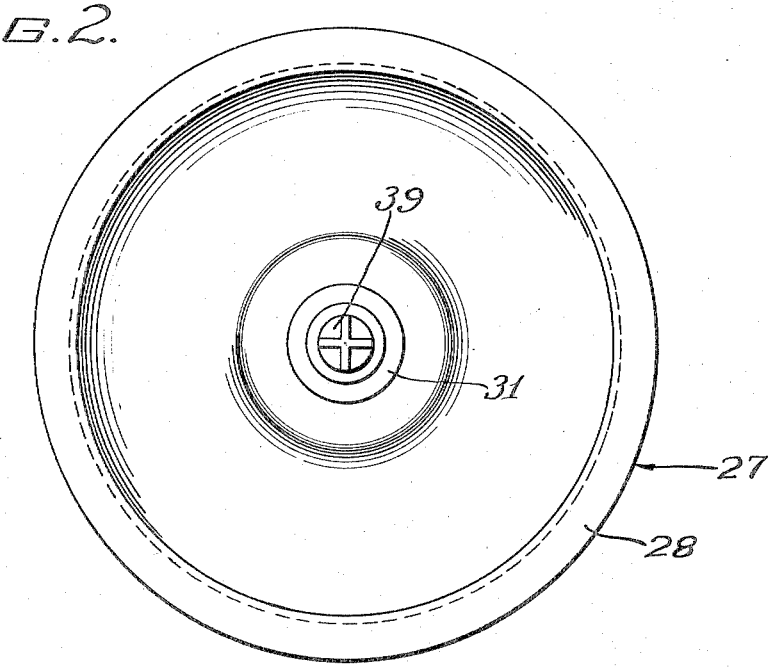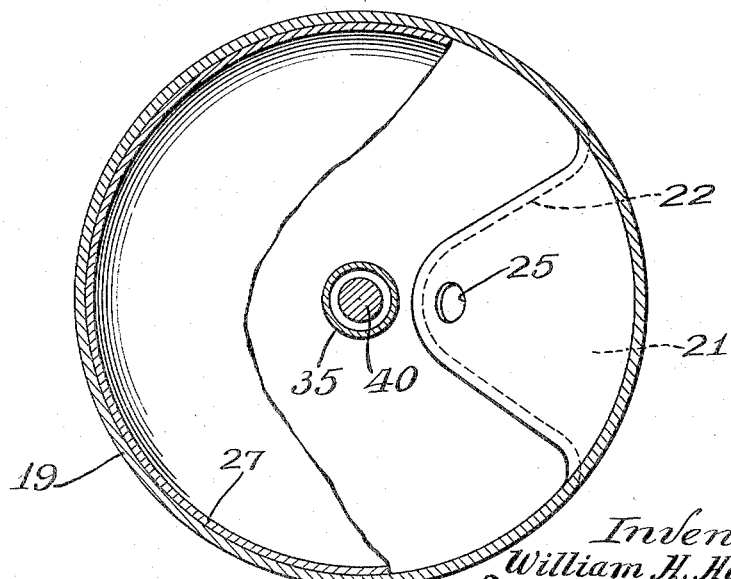

Patented Jan. 8, 1952

2,581,530

UNITED STATES PATENT OFFICE 2,581,530

MILKING MACHINE TRAP

William H. Harstick, Oak Park, Ill., assignor to International Harvester Company, a corporation of New Jersey Application December 22, 1949, Serial No. 134,496

7 Claims. (Cl. 119—14.46)

This invention relates to an improved trap container for use in connection with a milking machine. More specifically, the invention relates to a liquid trap which is adapted to be contained within the milker receptacle of a milking machine.

Milking units to which the present invention may be adapted are well-known to those familiar with the art of milking. A milker unit usually consists of a milker pail which includes a removable cover that is held in sealing relation with respect to the receptacle during a vacuum depression therein. The cover also usually includes a milk inlet or pet cock connection which is adapted to draw milk through the milk conduit connected to a milker claw. The milking action on the teats of the cow is obtained by the utilization of a pulsating device arranged to intermittently collapse conventional teat cup inflations engaging the teats of the cow, for securing the milk. The pulsating unit may be mounted on the cover of the milk receptacle. A vacuum connection is usually in communication with the pulsator, the vacuum connection generally running to a stanchion hose which in turn is in communication with a vacuum pump. The milk receptacle is generally in communication with the source of vacuum through a chamber provided in the pulsating unit.

During the milking operation it is exceedingly important that the milk within the receptacle remains free of any contamination. Contamination might occur if for some reason the vacuum connection between the pulsator and the stanchion hose is broken. Under a condition of this type liquids within the pulsator and within the vacuum connection would likely be sucked into the milking receptacle since the receptacle would for a short time contain a vacuum depression. Under other conditions of operation a teat cup inflation may become broken whereupon milk, as it is withdrawn from the cow, enters into the vacuum connection being drawn back in the pulsator and subsequently into the receptacle. This undesirable condition has been recognized by Burrell and in his Patent 1,111,562 patented September 22, 1914 he shows a milking machine trap which is designed to safeguard the milk against the hazards of contamination.

It is the prime object of applicant to provide an improved milking machine trap, the trap being readily insertable within a conventional type of milker receptacle.

In traps of this nature the trap chamber has an opening in communication with the interior of the milk receptacle so that a vacuum depression is present within the receptacle during the milking operation. This vacuum depression, of course, is effective to draw the milk from the cow through the milk inlet connection into the receptacle. Since under certain conditions of operation contaminated liquids might be contained in the milker trap, it is desirable that the connection between the receptacle and the trap be substantially close to the top of the trap. Thus the contaminated fluids within the trap are prevented from flowing into the milker receptacle.

It is another object of applicant's invention to provide an improved arrangement for a vacuum connection between a milker receptacle and a trap chamber.

A still further object is to provide an improved liquid trap for a milking receptacle, the trap being integrally formed with the removable cover for the receptacle.

A still further object is to provide a liquid trap for a milk receptacle, the liquid trap including an upwardly extending dimple having an opening placing the upper end of the trap chamber in communication with the upper portion of a milker receptacle.

Applicant's invention is embodied in a liquid trap which is integrally formed with the removable cover for a milker receptacle. The cover is dished downwardly into the receptacle, thereby providing a trap chamber. The trap chamber is suitably sealed by means of a removable closure which is arranged to support a pulsating unit. The pulsating unit is in communication with the lower end of the trap chamber by means of a conduit which terminates adjacent the bottom of the trap. A novel vacuum connection is provided between the upper portion of the milker receptacle and the upper portion of the trap. This connection is in the form of an upwardly extending dimple which is pressed inwardly into the trap chamber. The dimple is provided at its maximum depth with an opening which is in communication with the milker receptacle and the upper portion of the trap. The novel arrangement disclosed and the objects accomplished will become more fully apparent from the description when examined in connection with the drawings.

In the drawings:

Fig. 2 is a plan view of a removable closure member for a liquid trap.

Fig. 3 is a sectional view through a liquid trap taken substantially along the line 3—3 of Fig. 1.

Figure 1:
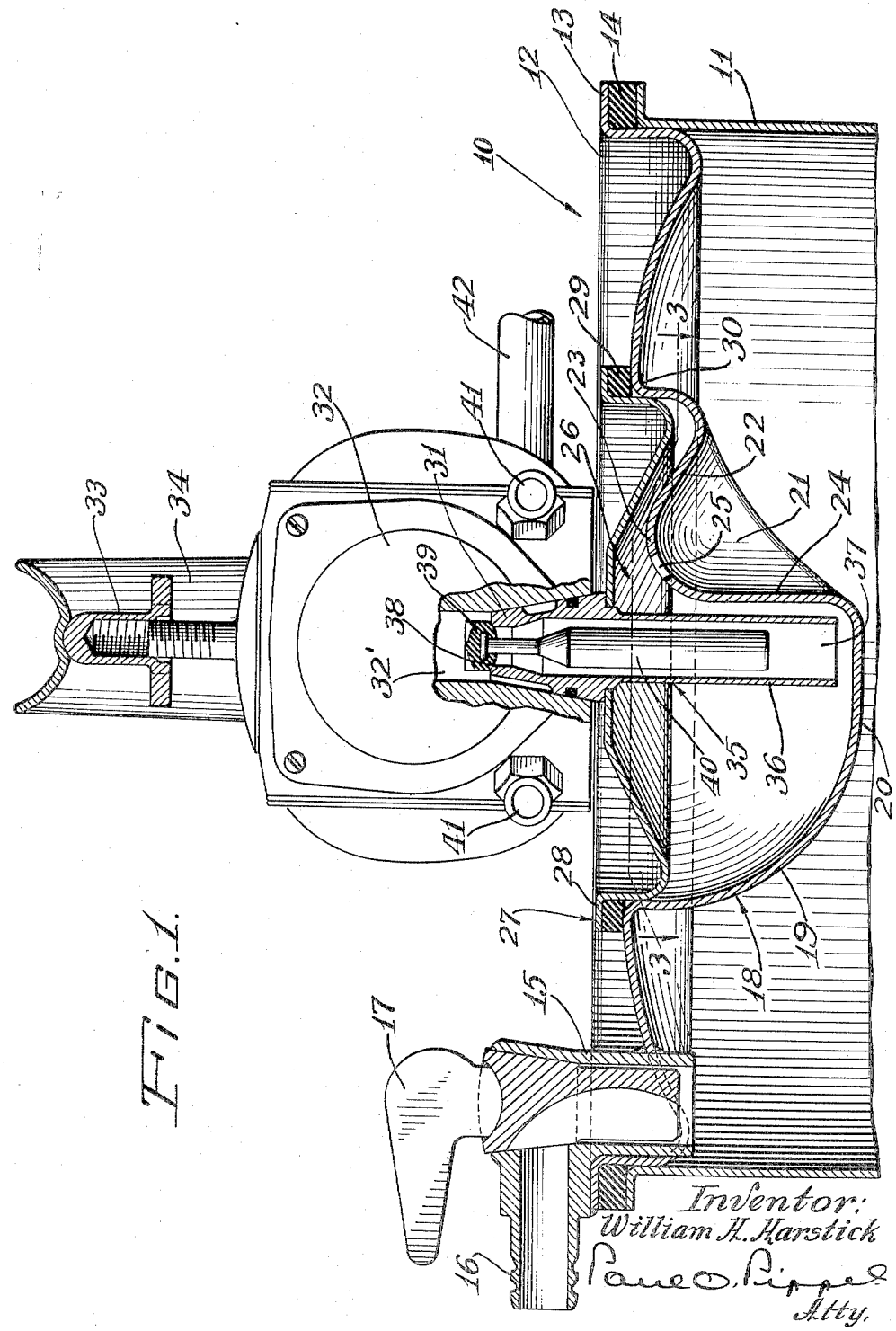
Fig. 1 is a sectional view in elevation through a milking machine, the machine including a milker receptacle, a liquid trap, and a pulsating unit mounted on a removable cover for the receptacle.

Referring particularly to Fig. 1, a milking machine is generally designated by the reference character 10. The milking machine includes a milker receptacle 11 which is adapted to be sealed by means of a horizontally extending cover 12. The cover 12 includes an outwardly projecting annular flange 13 which is in sealing engagement with the receptacle by means of a rubber sealing ring 14. The cover 12 includes a conventional type of milk inlet connection 15 having a conduit 16 which is adapted to be connected to a conventional milker hose (not shown) leading to a milker claw (not shown). The milk inlet connection 15 may be controlled by means of a conventional petcock 17.

A liquid trap positioned within the receptacle 11 is generally designated by the reference character 18. The trap 18 is integrally formed with the cover 12, the cover being provided with a dished portion 19. The dished portion 19 is pressed down inwardly into the receptacle and includes a bottom 20. In the present disclosure as best shown in Figs. 1 and 3, the dished portion 19 is of hemispherical shape but it must be readily understood that the trap may be constructed of a variety of shapes. The hemispherical shape is especially desirable from the standpoint of cleaning since it presents a minimum of sharp corners.

The bottom 20 of the trap 18 is formed with an upwardly extending dimple 21. The dimple may also be described as a flared depression which extends inwardly into the trap 18. The dimple 21 includes a cone-shaped wall 22 which terminates at an apex 23. The cone-shaped wall 22 includes a vertical portion 24 which extends substantially perpendicular with respect to the horizontal cover 12. The dimple 21 at its apex 23 is provided with an opening 25. The opening 25 places the upper end of the receptacle 11 in communication with the upper portion of the trap 18.

The trap 18 is provided with a removable closure 27 best shown in Figs. 1 and 2. The closure 27 includes an annular flange 28 which engages a rubber sealing ring 29 for securely sealing the trap 18 during the depression within the trap 18 and within the container 11. The dished portion 19 is provided with an annular sealing edge 30 which is engaged by the sealing ring 29 as best shown in Fig. 1.

The removable closure 27 includes an upwardly extending portion or boss 31 which is adapted to mount a pulsating unit 32. The pulsating unit 32 may be of conventional construction including a chamber 32' which is adapted to be placed in communication with the trap 18 and the receptacle 11.

A threaded connection 33 engages a conventional bale-shaped handle 34 provided on the cover 12, the connection 33 being arranged to firmly seat the pulsating unit 32 on the upwardly extending boss 31. A vacuum connection 35 places the chamber 32' in communication with the trap 18. The vacuum connection 35 includes a conduit 36 which has its lower end terminating in an opening 37 positioned substantially close to the bottom 20 of the trap 18. The conduit 36 also has an opening 38 at its upper end, this opening normally being in communication with the chamber 32'. A check valve 39 is seated over the opening 38. The check valve includes a weight 40 which is positioned within the conduit 36. The valve 39 is so arranged as to open outwardly of the trap 18, the valve moving upwardly during a vacuum depression within the chamber 32'.

The pulsating unit 32 is provided with conventional teat cup connections 41. A source of vacuum for the chamber 32', the trap 18, and the receptacle 11 is provided by means of a conduit 42 which is adapted to connect to a vacuum pipe line or vacuum pump (not shown).

During the operation of the milking machine 10 the receptacle 11 is placed under a vacuum depression. This vacuum depression results from the communication of the chamber 32' with the trap 18 and the trap 18 being in communication with the receptacle by means of the opening 25. Milk flows inwardly into the receptacle through the milk inlet connection 15. If for any reason the vacuum connection between the conduit 42 and the source of vacuum is broken, liquid within the pulsating unit might find its way into the trap 18. The check valve 39 is normally provided to prevent the entrance of liquids into the trap 18. However, under certain conditions, the valve may be inoperative or unable to seat properly and thus liquids will find their way into the trap 18. The opening 25 is placed sufficiently close to the top of the trap 18 so that the liquids collecting within the trap 18 will be prevented from entering into the milk receptacle 11. The trap is made sufficiently large so that the liquid level will stay below the opening 25 even under extraordinary conditions. The vacuum connection 35 extends sufficiently close to the bottom of the trap 18 so that any liquid in the trap will be again picked up and drawn into the vacuum system when the system is again placed into communication with a source of vacuum.

Under certain conditions as the milk enters into the receptacle 11 droplets of milk will form on the underneath side of the cover 12. These droplets of milk may result from the surging and splashing action of the milk as it enters into the receptacle 11. It is desirable that these droplets of milk remain within the receptacle and that means be provided for preventing these droplets from being drawn into the liquid trap. Normally the air from the receptacle is drawn by suction through the opening 25 into the trap 18 and thereupon out into the vacuum system. This flow of air would normally cause droplets of milk hanging around and adjacent the trap opening 25 to be picked up in the air stream and to become lodged in the trap 18. Applicant can overcome this undesirable aspect with his improved construction wherein a dimple is formed in the bottom of the trap. The dimple is of flared construction, being provided at its lower end with a large diameter opening which tapers in cone-shape fashion to the relatively small opening 25. The effect of this arrangement is to lower the velocity of the air as it enters at the widest point of the flare and therefore there is little chance of droplets hanging around the lower edge of the dimple from being drawn inwardly into the dimple toward the opening. In other words, with this type of construction it can readily be appreciated that the velocity of air flow through the large end of the cone-shaped dimple 21 is sufficiently reduced so that it will not entrain droplets hanging around the edge of the opening and sweep them into trap 18 through opening 25 through which it passes at a relatively higher velocity.

It is clearly apparent that applicant has provided a novel arrangement to prevent the possible entrance of milk droplets from the receptacle into the milk trap. By forming the depression within the bottom of the dished portion 19 an economical and effective construction is provided. As best shown in Fig. 1 the dimple includes a vertical portion 24, this portion being substantially perpendicular with respect to the cover 12. The vertical portion 24 permits the opening to be located substantially near the center of the trap thus eliminating the possibility of contaminated liquid from entering into the receptacle through the opening 25 when the receptacle and trap are tipped at an angle.

It is clearly apparent that applicant has provided a novel and effective moisture trap for a milking machine. The trap is effective to prevent undesirable liquids from entering into the milk receptacle and is also designed to prevent the entrance of milk droplets from the receptacle into the trap. It must be understood that modifications may be made which do not depart from the contemplated scope of applicant's claims.

What is claimed is:

1. In a milker receptacle having a milk inlet connection, a trap for the receptacle, said trap including a trap chamber disposed within the receptacle, and a vacuum connection for said chamber being adapted to be connected to a source of vacuum, said trap including a dimpled portion projecting inwardly into said trap, said dimpled portion including an opening communicating with the upper portion of said trap chamber, said opening also communicating with the upper portion of said milker receptacle to provide for communication between the vacuum connection and said milker receptacle.

2. A milker unit comprising a milk receiving receptacle, a cover for said receptacle, said receptacle including a milk inlet connection, a trap container projecting into said receptacle, an upwardly extending depressed portion formed in said container, said depressed portion having sides converging toward an apex, the depressed portion including an opening communicating with the upper portion of said trap container, and a conduit within said container having an opening terminating substantially adjacent the bottom of said container, said conduit being adapted to be connected to a source of vacuum.

3. A milker unit comprising a milk receiving receptacle, a cover for said receptacle, said receptacle including a milk inlet connection, a trap container projecting into said receptacle, an upwardly extending depressed portion formed in said container, said depressed portion having sides converging toward an apex, the depressed portion including an opening communicating with the upper portion of said trap container, a conduit within said container having an opening terminating substantially adjacent the bottom of said container, said conduit being adapted to be connected to a source of vacuum, and a check valve for said conduit, said valve being arranged to open outwardly of said container.

4. A milker unit comprising a milk receiving receptacle, a cover for said receptacle, said receptacle including a milk inlet connection, a trap container for said receptacle, said trap having a bottom portion with an inwardly extending depression forming a dimple, said dimple including an opening in communcation with the upper portion of said container and the upper portion of said receptacle, and a vacuum connection for said trap container.

5. A milker unit comprising a milk receiving receptacle, a horizontal removable cover for said receptacle, said cover including a milk inlet connection, a dished portion on said cover, said dished portion projecting downwardly into said receptacle thereby forming a trap chamber, an upwardly extending depression formed in said dished portion, said depression having sides terminating adjacent an opening communicating with the upper portion of the receptacle and the upper portion of said trap chamber, one of said converging sides extending substantially perpendicular with respect to said cover, a removable closure for said trap chamber, said closure including a vacuum connection adapted to connect to a source of vacuum, said connection including an upright conduit having one end terminating substantially adjacent the lower portion of said trap chamber, and a check valve for said conduit opening outwardly of said trap chamber.

6. A milker unit comprising a milk receiving receptacle, a cover for said receptacle, said receptacle including a milk inlet connection, a trap container projecting into said receptacle, said container having a removable closure, a dimple formed in said container, said dimple having one side extending substantially vertically with respect to said container, said dimple having an opening communicating with the upper portion of the container and the upper portion of said receptacle, and a vacuum connection on said container adapted to connect to a source of vacuum.

7. A milker unit comprising a milk receiving receptacle, a horizontal removable cover for said receptacle, said cover including a milk inlet connection, a dished portion integrally formed in said cover, said dished portion projecting downwardly into said receptacle thereby forming a trap chamber, an upwardly extending depression formed in said dished portion, said depression having converging sides terminating adjacent an opening communicating with the upper portion of the receptacle and the upper portion of said trap chamber, one of said converging sides extending substantially perpendicular with respect to said cover, a removable closure for said trap chamber, said closure including an upwardly extending connecting hose adapted to connect to and support a pulsating unit, a vacuum connection on said hose communicating with said trap chamber, said connection including an upright conduit having one end terminating substantially adjacent the lower portion of said trap chamber, and a check valve for said conduit opening outwardly of said trap chamber.

WILLIAM H. HARSTICK.

REFERENCES CITED

The following references are of record in the file of this patent:

UNITED STATES PATENTS

| Number | Name | Date |
| --- | --- | --- |
| 203,868 | Adams | May 21, 1878 |
| 844,780 | Cram | Feb. 19, 1907 |
| 1,111,562 | Burrell | Sept. 22, 1914 |
| 1,139,147 | West | May 11, 1915 |
| 1,350,109 | Nystrom | Aug. 17, 1920 |
| 1,534,670 | Smith | Apr. 21, 1925 |
| 1,950,227 | Chevalier | Mar. 6, 1934 |
| 2,100,636 | Domershausen | Nov. 20, 1937 |

FOREIGN PATENTS

| Number | Country | Date |
| --- | --- | --- |
| 33,082 | Denmark | Apr. 14, 1924 |